United States Patent [19]

Ogata

[11] Patent Number: 4,740,850
[45] Date of Patent: Apr. 26, 1988

[54] MAGNETIC TAPE LOADING APPARATUS FOR TAPE RECORDER

[75] Inventor: Haruki Ogata, Sagamihara, Japan

[73] Assignee: Victor Company of Japan, Ltd., Japan

[21] Appl. No.: 852,359

[22] Filed: Apr. 15, 1986

[30] Foreign Application Priority Data

Apr. 16, 1985 [JP] Japan .................................. 60-81035

[51] Int. Cl.[4] ............................................. G11B 5/027
[52] U.S. Cl. ........................................ 360/85; 360/95; 360/130.23
[58] Field of Search ........................ 360/81, 84, 85, 95, 360/130.23, 130.24

[56] References Cited

U.S. PATENT DOCUMENTS

| | | | |
|---|---|---|---|
| 3,661,344 | 5/1972 | Nakamura et al. ................ | 360/85 X |
| 3,697,676 | 10/1972 | Protas ................................ | 360/84 X |
| 3,860,960 | 1/1975 | Akamine ............................ | 360/85 |
| 4,357,639 | 11/1982 | Hama et al. ....................... | 360/85 |
| 4,620,245 | 10/1986 | Shimizu ............................. | 360/85 |

*Primary Examiner*—Robert S. Tupper
*Assistant Examiner*—Andrew L. Sniezek
*Attorney, Agent, or Firm*—Lowe, Price, LeBlanc, Becker & Shur

[57] ABSTRACT

A tape loading apparatus for a tape recorder comprises a loading device for taking out a magnetic tape of a cassette and wrapping the tape around a head drum of the tape recorder and a loading device driving mechanism for operating the loading device to load the tape. The loading device includes a pair of base plates each having loading poles, and the loading device driving mechanism includes a pair of parallel threaded shafts with the head drum interposed therebetween. A pair of nut members are respectively engaged with the threaded shafts. The threaded shafts are arranged to be concurrently rotated by a reversible motor so that the pair of nut members are respectively moved along the axes of the threaded shafts. Each of the nut members is elastically coupled, through a connecting mechanism including a coil spring, to the base plates so that the base plates are respectively movable in association with the movement of the nut members to thereby cause it to load the tape.

4 Claims, 2 Drawing Sheets

MAGNETIC TAPE LOADING APPARATUS FOR TAPE RECORDER

BACKGROUND OF THE INVENTION

The present invention relates to a magnetic tape loading apparatus, and in particular to a magnetic tape loading apparatus of a tape recorder wherein a magnetic tape received in a tape cassette is partially taken out and wrapped around a head drum provided therein. The present invention may be embodied, for example, in a video tape recorder of a helical scan type.

An important problem in the magnetic recording art relates to the need for a tape loading apparatus of a cassette tape recorder which can be simplified in construction with a view to minimizing the manufacturing cost and the size of the tape recorder and which will provide high reliability and accuracy for control of the stopping position of loading poles of the tape loading apparatus on slow-motion reproduction, still reproduction, in particular where movement of the magnetic tape is intermittent.

Various types of tape loading apparatus have been previously developed. One example of tape loading apparatus involves a technique in which vertical loading poles and inclined loading poles are operated in association with rotation of a ring gear provided below a head drum having magnetic heads so that a magnetic tape is wrapped around the head drum over a predetermined length. A further example of loading apparatus is one in which a magnetic tape is wrapped around a head drum by operating loading poles driven through a link mechanism comprising a plurality of links. However, because of the design limitations imposed on the provision of a plurality of gears for the rotation of the ring gear in the ring gear type tape loading apparatus and the provision of a speed-decreasing device for allowing the loading poles to be driven at a low speed in the link type tape loading apparatus, difficulty has been encountered in simplifying the tape loading apparatus according to the conventional techniques. Furthermore, none of the conventional tape loading apparatus satisfactorily performs accurate control of stopping position of the loading pole on slow-motion reproduction or still reproduction.

SUMMARY OF THE INVENTION

It is therefore an object of the present invention to provide a new and improved tape loading apparatus of a tape recorder which overcomes the above-mentioned disadvantages inherent in the prior art tape loading apparatus.

A tape loading apparatus of the present invention includes a loading device for taking out and wrapping a magnetic tape of a tape cassette around a head drum, having magnetic heads at the circumference thereof, over a predetermined length, and a loading device driving mechanism for allowing the loading device to load the tape. The driving mechanism comprises a pair of threaded shafts disposed in parallel to each other such that the head drum is interposed therebetween and a pair of nut members engaging with the threaded shafts. The threaded shafts are arranged to be concurrently rotated by means of a motor so that the nut members are respectively moved along the axes thereof. The loading device comprises a pair of base plates having tape loading poles, and is coupled to the driving mechanism to be movable in association with the movements of the nut members, i.e., to have a driven connection with the driving mechanism.

This arrangement not only makes it possible to simplify the structure of the tape loading apparatus and achieve the size reduction as compared with the conventional tape loading apparatus, but also offers a further advantage of making possible to accurately and selectively perform the control of stopping the position of the loading poles and thereby to provide a high quality picture with sufficient stability on slow-motion reproduction and still reproduction.

BRIEF DESCRIPTION OF THE DRAWINGS

The present invention will be described in further detail with reference to the accompanying drawings, in which.

DETAILED DESCRIPTION

Figure 1:
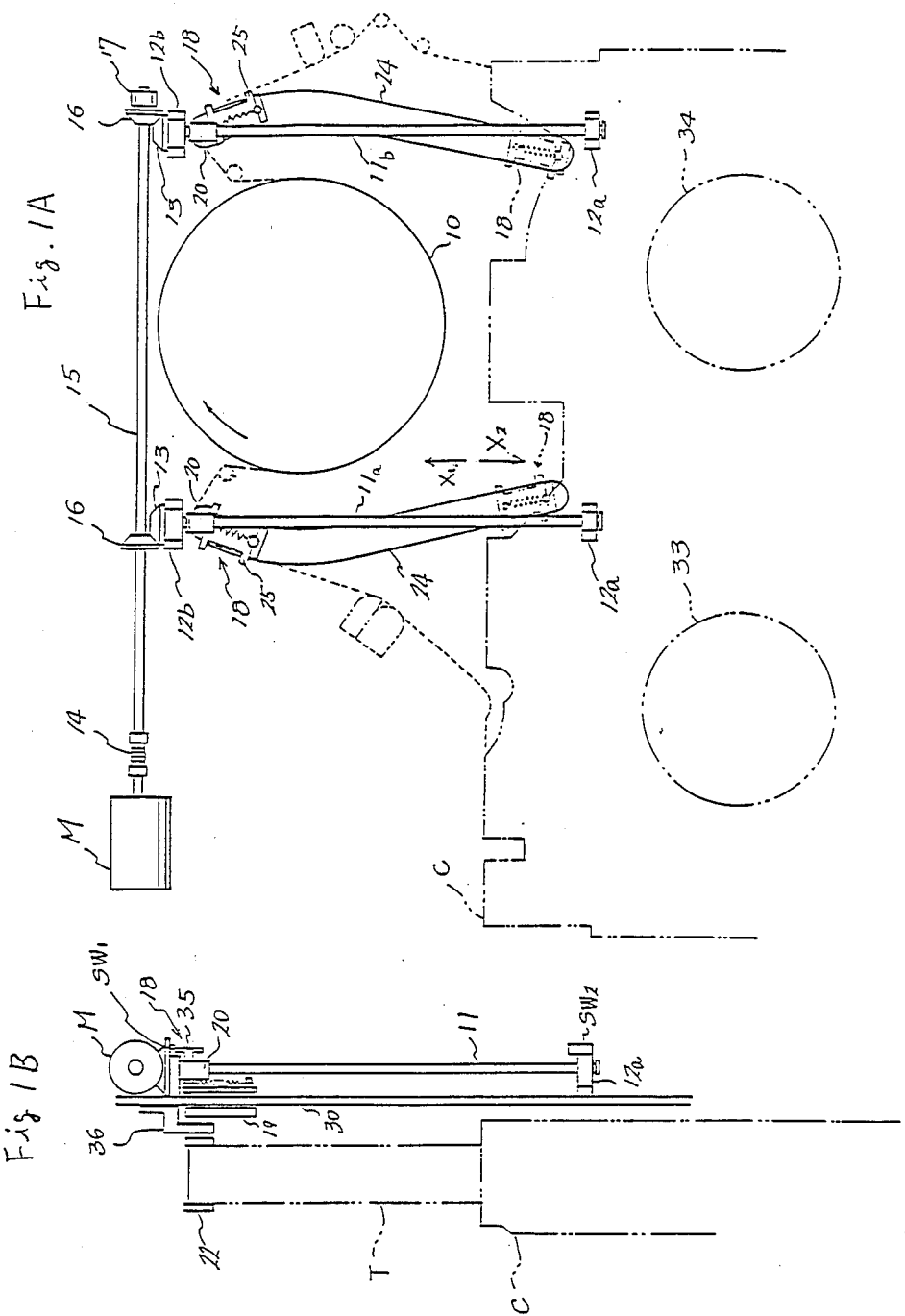
FIG. 1A is a bottom end view of a magnetic tape loading apparatus according to the present invention.
FIG. 1B is a side view showing the magnetic tape loading apparatus of FIG. 1A.

Referring now to FIGS. 1A and 1B, there is schematically illustrated a magnetic tape loading apparatus of the present invention. The tape loading apparatus comprises a head drum 10 having magnetic heads for recording pictures on a magnetic tape T of a tape cassette C or reproducing the pictures recorded on the magnetic tape T. The head drum 10 is interposed between a pair of first and second threaded shafts 11a and 11b, both being substantial parallel to each other and disposed in the direction substantially normal to the longitudinal direction of the tape cassette C inserted into the magnetic tape recorder, as seen from FIGS. 1A and 1B. Each of the threaded shafts 11a and 11b is rotatably supported by each of a pair of bearings 12a and 12b, and a pair of bevel gears 13 are respectively fixedly secured to ends of the threaded shafts 11a and 11b, being positioned apart from the tape cassette C, and are respectively engaged with a pair of bevel gears 16 mounted on a drive shaft 15 whose axis intersects the axes of the threaded shafts 11a and 11b at right angles. One end portion of the drive shaft 15 is coupled through a variable connector 14 to a reversible motor M. By rotation of motor M, the pair of bevel gears 13 are concurrently driven through bevel gears 16, resulting in rotation of threaded shafts 11a and 11b. Each of the threaded shafts 11a and 11b is engaged with a nut member 20 and therefore the rotation of the threaded shafts 11a and 11b causes the nut member 20 to move upward and downward (in the drawing figure). The other end of the drive shaft 15 is supported by a bearing 17. The above-mentioned mechanism including the pair of threaded shafts 11a, 11b, the pair of nut members 20, and the drive shaft 15 acts as a loading device driving mechanism.

Figure 2:
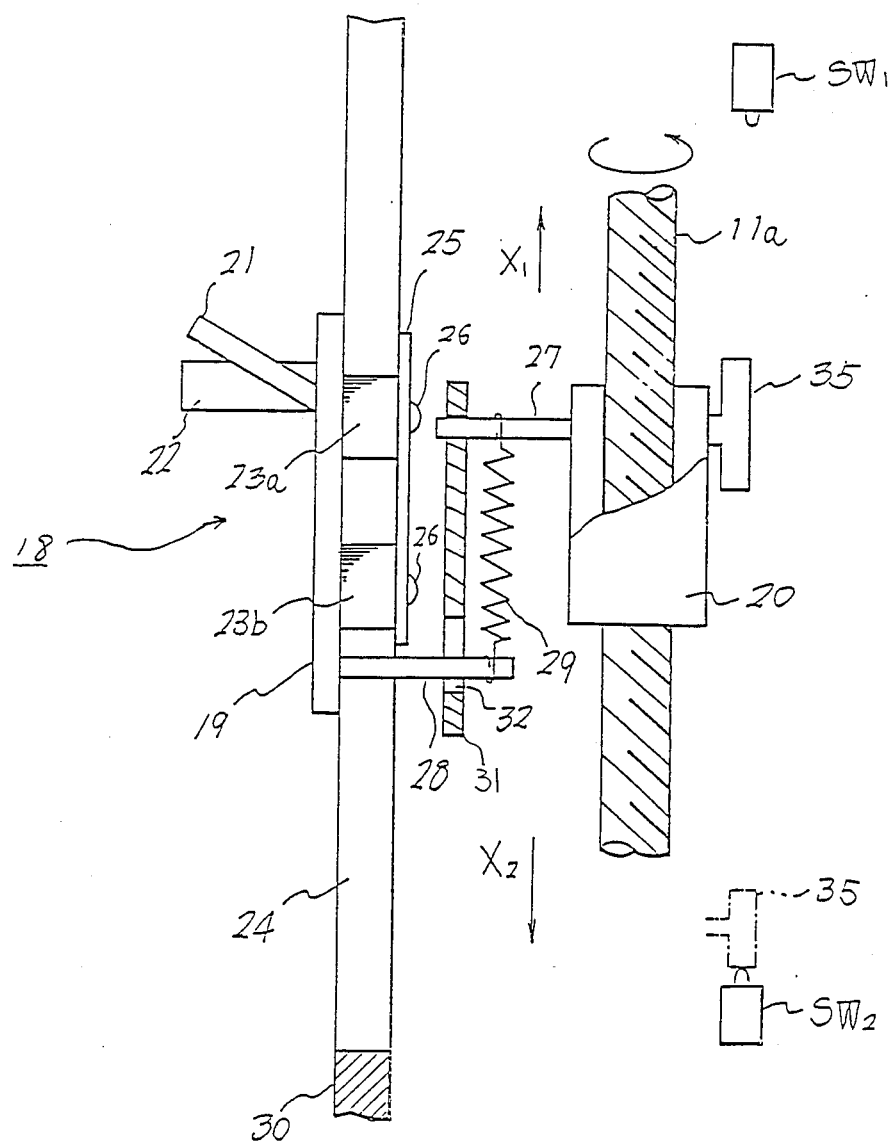
FIG. 2 is an enlarged detail of the loading mechanism and the loading device driving mechanism of the magnetic tape loading apparatus.

A tape loading device 18 employed for the tape loading apparatus of the present invention will be described with reference to FIG. 2 which illustrates the detailed arrangement of the tape loading device 18 in connection with the driving mechanism. A description will be made with respect to the tape loading device 18 in connection with the threaded shaft 11a.

The tape loading device 18 comprises a pair of symmetrical assemblies, each being coupled to each of the nut members 20 and comprising a base plate 19 having an inclined loading pole 21 and a vertical loading pole 22 for guiding the tape T from the tape cassette C toward the head drum 10. The base plate 19 has a pair of rollers 23a and 23b which are respectively disposed such that their axes are positioned in the direction perpendicular to a surface of the base plate 19 as clearly illustrated in FIG. 2. The pair of rollers 23a and 23b are inserted into an elongate slot 24 in a chassis 30 so that the surface of the base plate 19 comes into contact with a surface of the chassis 30. The pair of rollers 23a and 23b are secured through a leaf spring 25 by means of screws 26 at the other surface of the chassis 30 so that the chassis 30 is sandwiched between the base plate 19 and the leaf spring 25. This arrangement enables the base plate 19 to be reciprocated along the elongate slot 24. The elongate slot 24 is curved outwardly with respect to the head drum 10.

The base plate 19 is coupled, through connecting means comprising a pin 27, a connecting member 31, a coil spring 29, and a pin 28, to the nut member 20 threadly coupled to the threaded shaft 11. The pin 27 is mounted on the nut member 20 so that its axis extends in the direction normal to the axis of the threaded shaft 11a and it is disposed in opposed relation to the base plate 19. On the other hand, the pin 28 is mounted on the base plate 19 so that its axis extends in the direction perpendicular to the surface thereof and it is disposed through the elongate slot 24 in opposed relation to the nut member 20. The connecting member 31 is pivotally connected to the pin 27 at an end portion therof, while it is loosely coupled to the pin 28 which is inserted into an elongate hole 32 defined at the other end portion thereof, whereby the nut member 20 can be prevented from being rotated with the rotation of the threaded shaft 11a. The coil spring 29 is provided between the pins 27 and 28 to bias the base plate 19 thereby. The provision of the coil spring 29 achieves an elastic connection between the base plate 19 and the nut member 20.

With the above-described arrangement, the nut member 20 is moved straight in the direction indicated by an arrow X1 with, for example, forward rotation of the threaded shaft 11a on the tape loading operation, whereby the base plate 19 follows up along the elongate slot 24.

Turning back to FIGS. 1A and 1B, the operation of the tape loading apparatus will be described hereinbelow.

When the tape loading device 18 is placed at the positions indicated by a two-dot chain line in FIG. 1A, the tape loading apparatus is in unloading position. In response to the tape cassette C being inserted into the tape recorder, the motor M is operated and loading operation starts with the rotation of the threaded shafts 11a and 11b performed through the drive shaft 15, bevel gears 16, and bevel gears 13. This rotation of the threaded shafts 11a and 11b causes the straight movement of the nut members 20 in the direction indicated by the arrow X1, so that the magnetic tape T is drawn out from the tape cassette C to be wrapped around the head drum 10. When the tape loading device 18 reaches the loading end position indicated by solid-lines, a switching bar 35 mounted on the nut member 20 depresses a switch SW1 and concurrently the vertical loading poles 22 come into contact with stoppers 36, resulting in the termination of the loading operation. An this time, the tape T is wrapped around the head drum 10 by a predetermined amount, for example, about an angle of 180°. Thereafter, pinch roller (not shown) will be pressed toward a capstan (not shown) to drive tape T.

In the case of slow-motion reproduction or still reproduction, the driving mechanism comprising a pair of threaded shafts and a pair of nut members, enable the loading poles 22 to be accurately easily stopped at an appropriate position before reaching the loading end position.

On the other hand, in response to the demand for unloading of the tape the threaded shafts 11a and 11b are reversely rotated with the reverse rotation of the motor M so that the base plates 19 are respectively moved in the direction indicated by an arrow X2 and returned to the unloading position indicated by a two-dot chain line in FIG. 1A. When reaching the unloading position, the switching bar 35 depresses a switch SW2 and in response to the depression the loaded tape is returned to the tape cassette C through the operation of a take-up reel 33. The reference numeral 34 represents a tape supplying reel.

The requirement that the loading poles 21 and 22 are moved at low speed is easily achieved by only varying the pitch of the thread provided on the threaded shafts 11a and 11b.

It should be understood that the foregoing relates to only a preferred embodiment of the present invention, and that it is intended to cover all changes and modifications of the embodiment of the invention herein used for the purpose of the disclosures, which do not constitute departures from the spirit and scope of the invention.

What is claimed is:

1. A tape loading apparatus for a tape recorder which is arranged to take out a magnetic tape of a tape cassette inserted into said tape recorder and to wrap said magnetic tape around a head drum of said tape recorder, comprising:

a pair of threaded shafts disposed substantially parallel to each other and in a direction generally perpendicular to the axis of said head drum with said head drum being interposed therebetween, means for coupling said pair of threaded shafts to a reversible motor means so that each of said pair of threaded shafts is reversibly rotatable about its own axis in response to energization of said motor means;

a pair of nut members respectively engaging said pair of threaded shafts and movable along the axis of said threaded shafts in response to rotation of said threaded shafts;

a pair of base plates each including tape loading poles for taking out said magnetic tape from said tape cassette and carrying said magnetic tape to wrap it around said head drum, each of said pair of base plates being engaged with each of a pair of elongate slots formed in said tape recorder with said head drum being interposed therebetween, said slots being curved outwardly with respect to said head drum; and a pair of elastically connecting means each of which causes each of said pair of base plates to be elastically coupled to said each of said pair of nut members respectively therethrough so that each of said pair of base plates is movable along an arcuate path defined by said each of said pair of elongate slots in association with the movement of each of said nut members.

2. A tape loading apparatus as claimed in claim 1, wherein said pair of threaded shafts respectively have a pair of bevel gears at ends thereof which are respectively positioned apart from said tape cassette, said pair of bevel gears being engaged with another pair of bevel gears mounted on a drive shaft whose axis intersects the axes of said threaded shafts at substantially right angles and said drive shaft being coupled to a reversible motor so that said pair of threaded shafts are concurrently rotated by said motor.

3. A tape loading apparatus as claimed in claim 1, wherein each of said pair of elastically connecting means comprises:

a first pin member mounted on each of said pair of nut members so that its axis extends in a direction normal to the axis of each of said pair of threaded shafts, said first pin member being disposed in opposed relation to each of said pair of base plates;

a connecting member one end portion of which is pivotally connected to said first pin member and the other end portion of which has a hole;

a second pin member mounted on each of said pair of base plates so that its axis extends in a direction perpendicular to a surface of said base plates, said second pin member extending through said hole of said connecting member in opposed relation to said nut member; and elastic means provided between and connect to said first and second pin members.

4. A tape loading apparatus as claimed in claim 1, wherein said pair of threaded shafts are respectively disposed in a direction generally parallel to the direction that said tape cassette is inserted into said tape recorder.

* * * * *